United States Patent [19]

Holmes

[11] 4,338,015
[45] Jul. 6, 1982

[54] 35 MM CASSETTE WITH FILM REWIND LIMIT, EXPOSURE INDICATOR, AND FILM RELEASE

[75] Inventor: William A. Holmes, Marblehead, Mass.

[73] Assignee: Polaroid Corporation, Cambridge, Mass.

[21] Appl. No.: 240,014

[22] Filed: Mar. 3, 1981

[51] Int. Cl.³ .................. G03B 17/26; B65H 75/28
[52] U.S. Cl. ................................. 354/275; 242/74.2
[58] Field of Search .................. 354/202, 212–218, 354/275; 242/71, 71.1, 71.2, 71.6, 71.7, 71.8, 74, 74.1, 74.2

[56] References Cited

U.S. PATENT DOCUMENTS

| | | | |
|---|---|---|---|
| 3,136,291 | 6/1964 | Irisawa et al. | 354/218 X |
| 3,550,877 | 12/1970 | Sutliff et al. | 242/180 |
| 3,602,451 | 8/1971 | Dolby | 242/74.2 |
| 3,645,467 | 2/1972 | Sato et al. | 242/74.2 |
| 3,978,495 | 8/1976 | Warscheit | 354/5 |
| 4,014,035 | 3/1977 | Canfield | 242/71 X |
| 4,145,133 | 3/1979 | Wareham | 354/275 |
| 4,212,527 | 7/1980 | Fischer | 354/275 |

*Primary Examiner*—Donald A. Griffin
*Attorney, Agent, or Firm*—Alfred E. Corrigan

[57] ABSTRACT

A photographic film assemblage including a film cassette having an exit, a hollow film spool rotatably mounted within the cassette, and a strip of film coiled about the spool with a first end extending to the exterior of the cassette via the exit and a second end releasably attached to the spool. Mounted within the spool is a threaded shaft and nut assembly having a spool drive on one end thereof. The shaft is ordinarily fixed against rotation relative to the nut, and the latter is coupled to the spool by a spline-keyway combination such that rotation of the spool causes the nut to rotate on the shaft while simultaneously traversing its length. The forces of uncoiling the film during its exposure in a camera and its subsequent recoiling into the cassette are transferred to the nut via the spool to move it into a position wherein it locks the spool against further rotation in a direction which would enable the film to be completely uncoiled from the spool during its exposure; and into a disabling position in which it moves the spool drive out of driving engagement with the spool before the first end of the exposed film has been moved to the interior of the cassette. Prior to processing the film, the shaft is moved into a position in which the spool may continue to be rotated until the second end of the film becomes detached from the spool.

22 Claims, 6 Drawing Figures

35 MM CASSETTE WITH FILM REWIND LIMIT, EXPOSURE INDICATOR, AND FILM RELEASE

BACKGROUND OF THE INVENTION

1. Field of the Invention

This invention relates to a photographic film assemblage including a roll of unexposed film, which assemblage is adapted for use in a hand-held camera.

2. Description of the Prior Art

The present invention relates to a photographic film assemblage including a film cassette having a film exit, a film supporting spool, and a length of unexposed film coiled about the spool and having one end secured thereto and its opposite end extending to the exterior of the cassette via the exit and, more particularly, to a film assemblage of the type adapted for use with 35 mm cameras presently on the market.

Film assemblages of the type described above are generally well known and each is adapted to be located within a film cassette compartment in a hand-held camera such that the portion of film extending exteriorly of the film cassette may be run across the focal plane of the camera and attached to a film take-up reel. The loading door of the camera is then closed and the individual frames in the film are sequentially exposed as the previously exposed frames are wound upon the take-up reel. The trailing end of the film is generally fixedly attached to the spool in the film cassette in order to prevent the complete withdrawal of the film from the cassette during the exposure of the film. After the last frame has been exposed, the film is recoiled about the spool in the cassette until only the leader or leading end section of the film remains outside the cassette, or until the leading end section has been completely moved to the exterior of the film cassette. Next, the film assemblage is removed from the camera and the exposed film is processed. During processing, the trailing end of the film is detached from its spool, generally by a film cutting apparatus, such that the remainder of the processing cycle may be carried out. Accordingly, it can be seen that although the securing of the trailing end of the film to the spool prevents the inadvertent, or otherwise, complete withdrawl of the film from the cassette during exposure, one must compensate for it, the securement, by providing the processing apparatus with means for severing the trailing end of the film from the spool.

U.S. Pat. No. 4,212,527 describes a film assemblage of the type described above which includes means on the leading end of the film for preventing it from being rewound completely into a film cassette. Thus, while this feature facilitates the subsequent processing of the film, it appears that the trailing end of the film is still attached to the spool of the assemblage thereby requiring separate means in the film processor for identifying when the film has been substantially uncoiled from the spool and then stopping the motor of the film processor.

U.S. Pat. No. 4,145,133 describes a film assemblage having a cassette which rotatably supports a spool having a length of film wound thereupon, but not secured thereto. Also, the film includes means for preventing its leading end from being fully rewound into the film cassette. One problem with this assemblage is that the film may be inadvertently fully withdrawn from the cassette during its exposure thereby rendering the exposed film useless for all practical purposes.

U.S. Pat. No. 3,550,877 discloses a film assemblage including a cassette, a spool rotatably supported within the cassette, and a length of film wound upon the spool. An antibackup shuttle prevents reverse rotation of the spool to unwind the film for processing. The processing apparatus for this film assemblage includes a punch which punctures the side of the cassette and displaces the shuttle axially to an inoperative position. Here again, one has a film processor wherein a severing or cutting operation must be preformed. Not only must one continually maintain the sharpness of the cutting tool in the processor, but also there remains the problem created by fragments of the cassette, caused by the cutting or puncturing operation, entering the processor.

Finally, U.S. Pat. No. 3,978,495 shows a cassette having a spool upon which a length of exposed film is adapted to be wound with one end of the film releasably secured to the spool. However, this cassette is not part of a film assemblage of the type described, nor does it relate to the problem of retaining the trailing end of film in engagement with the spool during exposure of the film in a hand-held camera, and releasing it during processing of the exposed film.

Another problem with film assemblages of the type described is that they are not provided with means for indicating whether or not the film within the film cassette has been photographically exposed. For example, one may remove a film cassette containing an exposed roll of film from a camera and set it aside for processing at a later date. However, at this later date, the photographer may not remember if that particular film cassette contains exposed film.

SUMMARY OF THE INVENTION

The instant invention relates to a photographic film assemblage of the type adapted for use in hand-held cameras, preferably of the 35 mm type. The film assemblage includes a film cassette having an exit opening therein, a spool rotatably supported within the film cassette, a length of unexposed film wound upon the spool with a trailing end portion releasably secured to the spool and its opposite end, i.e., the leader or leading end portion, extending to the exterior of the cassette via the exit opening, and means for (1) preventing the trailing end of the film from becoming disengaged from the spool during exposure of the film, (2) preventing the movement of the leading end of the film into the film cassette during recoiling of the film about the spool, and (3) allowing the trailing end of the film to move out of engagement with the spool during processing of the exposed film. This latter means includes a threaded shaft which is suitably mounted within a passageway in the spool, a nut which is threaded onto the shaft and coupled with the spool by a spline-keyway combination, and a spool drive which is mounted on one end of the shaft and which is adapted to be driven by a component of a camera for recoiling the film about the spool subsequent to its exposure. As the film is being uncoiled from the spool during its exposure, it rotates the spool in a first direction which, through the aforementioned spline-keyway combination, functions to drive the nut along the shaft until a protuberance on the nut rotates into engagement with a similar protrusion extending in the opposite direction from the head of the shaft. This engagement occurs before the film has been completely uncoiled from the spool and functions to prohibit further rotation of the spool in the first direction. Also, at this time the nut moves a member into a position which is indicative of the fact that the film has been fully exposed. When the camera's film rewind mechanism is activated, the spool drive rotates the spool in a second direction thereby recoiling the exposed film about the spool while simultaneously causing the nut to run along the shaft until it engages and moves the spool drive to an inoperative position. This engagement takes place prior to the leading end of the film being rewound fully into the film cassette.

The film assemblage containing the exposed film is adapted to be placed in a film processor where the leading end of the film is attached to a take-up reel. After the processor has been rendered lighttight by closing its film cassette loading door, the take-up reel is rotated so as to superpose the exposed film with a sheet of material having a processing liquid coated thereon. During the loading of the film assemblage into the processor or, preferably, in response to the closing of the loading door, the shaft is moved into a position wherein it, the nut, and the film spool may rotate as a unit under the influence of the force of the film being uncoiled therefrom and coiled upon the take-up reel in superposed relation with the coated sheet material. Accordingly, the nut does not traverse the length of the shaft and the spool is free to be rotated until the exposed film has been completely uncoiled therefrom. The superposed film and sheet material remain upon the take-up reel until the processing of the film has been substantially completed. The sheet material is then rewound about its roller or spool as the processed film is stripped therefrom and led to the exterior of the processor. For further details of a processor usable with the instant film assemblage, reference may had to the copending application of Leonard V. Bendoni et al., application Ser. No. 207,686, filed Nov. 17, 1980, and assigned in common herewith.

An object of the invention is to provide a photographic film assemblage including a rotatable spool having a length of film coiled thereabout with one end of the film releasably attached to the spool with means for preventing rotation of the spool subsequent to the last frame therein being photographically exposed within a camera but before the end of the film becomes detached from the spool.

Another object of the invention is to provide a photographic film assemblage with means, responsive to the rotation of a film spool during the recoiling of a length of exposed film, for preventing the movement of a leading end portion of the film into a film cassette.

Still another object of the invention is to provide a photographic film assemblage of the 35 mm type with means for indicating that the film therein has been exposed.

Still another object of the invention is to provide a photographic film assemblage of the type described with means for allowing a film spool to be rotated during the processing of the film until its trailing end moves out of engagement with the film spool.

Other objects of the invention will in part be obvious and will in part appear hereinafter.

The invention accordingly comprises the photographic film assemblage possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in conjunction with the accompanying drawings wherein.

DETAILED DESCRIPTION OF THE INVENTION

Figure 1:
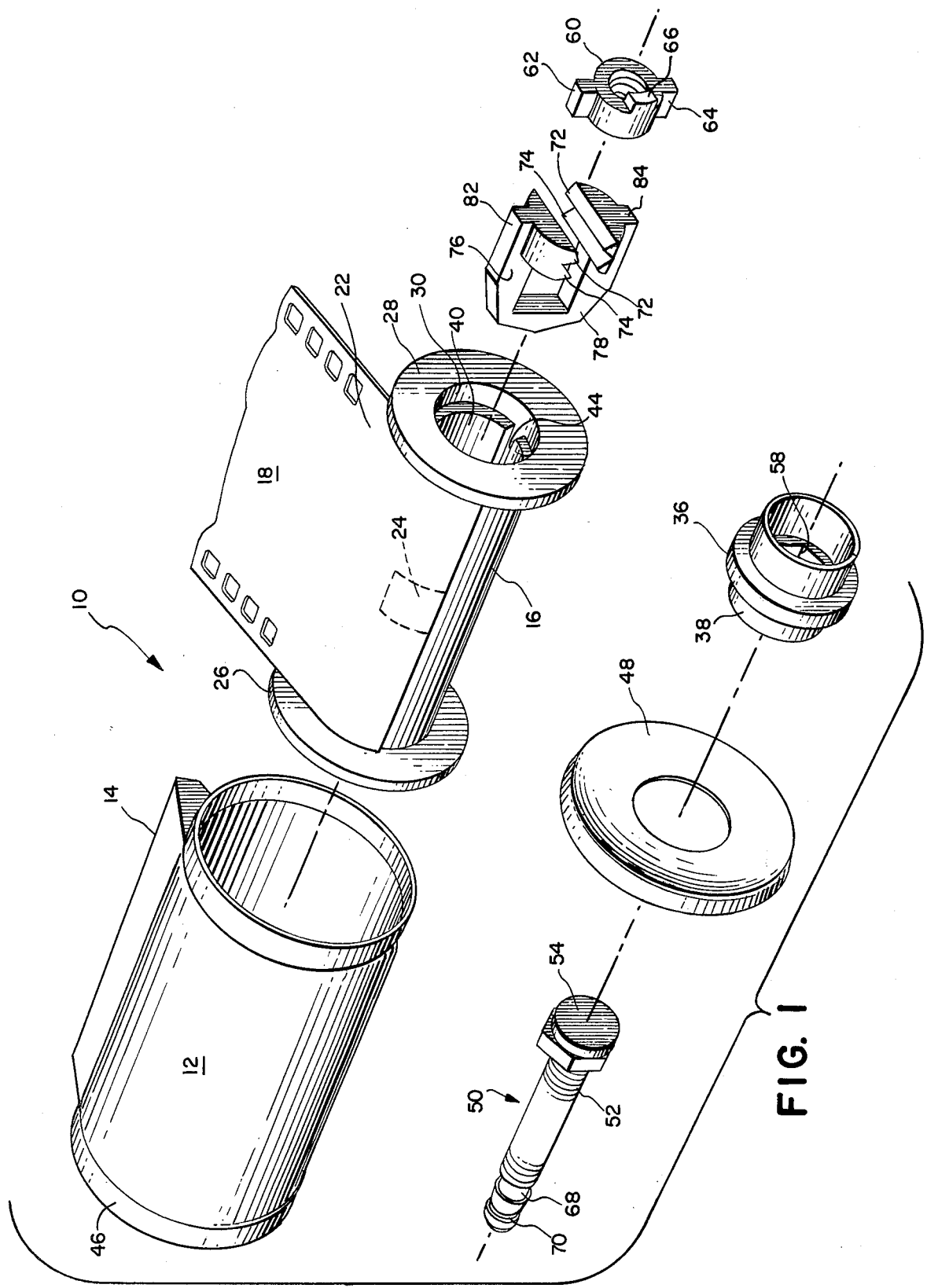
FIG. 1 is an enlarged exploded perspective view of a photographic film assemblage which incorporates the instant invention.

Reference is now made to the drawings and, in particular, to FIG. 1 wherein is shown, in exposed form, a photographic film assemblage 10, the major length of the film being omitted from FIG. 1 for reasons of clarity. The film assemblage 10 includes a lighttight film cassette 12 having a pair of lips which define an exit opening 14, a spool 16, and a length of strip of film 18 having a first end 20 which is adapted to extend to the exterior of the film cassette 12 via the exit 14 and a second end 22 which is adapted to be releasably secured to the spool 16 by any suitable means such as a piece of tape 24 having an adhesive surface on each surface thereof.

The film spool 16 is molded from any suitable plastic, e.g., polystyrene, and includes a pair of annular flanges 26 and 28 which provide lateral support for the film 18 which is coiled about the film spool 16 and a centrally located, longitudinally extending passageway 30. One end of the spool 16 includes a circular opening 32 defined by an annular flange 34, said opening 32 being of a lesser diameter than the diameter of the adjacent portion of the passageway 30. A bushing 36 is telescopically received by the other end of the passageway 30 and includes a circular portion 38 which functions as a bearing surface for rotatably supporting the spool 16. An intermediate portion of passageway 30, identified by reference character 40, extends from a point adjacent to the left-hand face of the bushing 36, as viewed in FIG. 2, to a point approximately two-thirds of the distance toward the other end of the passageway 30. This intermediate portion 40 is of a smaller diameter than that of the passageway 30 and is provided with a pair of longitudinally extending keyways 42 and 44 which are spaced one-hundred and eighty degrees from each other. The spool 16 with the film 18 coiled thereabout is adapted to be located within the cassette 12 and rotatively supported thereby by a pair of metal end caps 46 and 48 and the bushing 36.

Mounted within the passageway 30 is a shaft 50 having a left-hand thread 52 throughout substantially its entire length and a head 54 from which extends a stop 56. The head 54 of the shaft 50 is six sided, as best seen in FIG. 1, and is adapted to be received within a correspondingly shaped opening 58 in the bushing 36 to prevent the shaft 50 from rotating with the spool 16.

Figure 2:
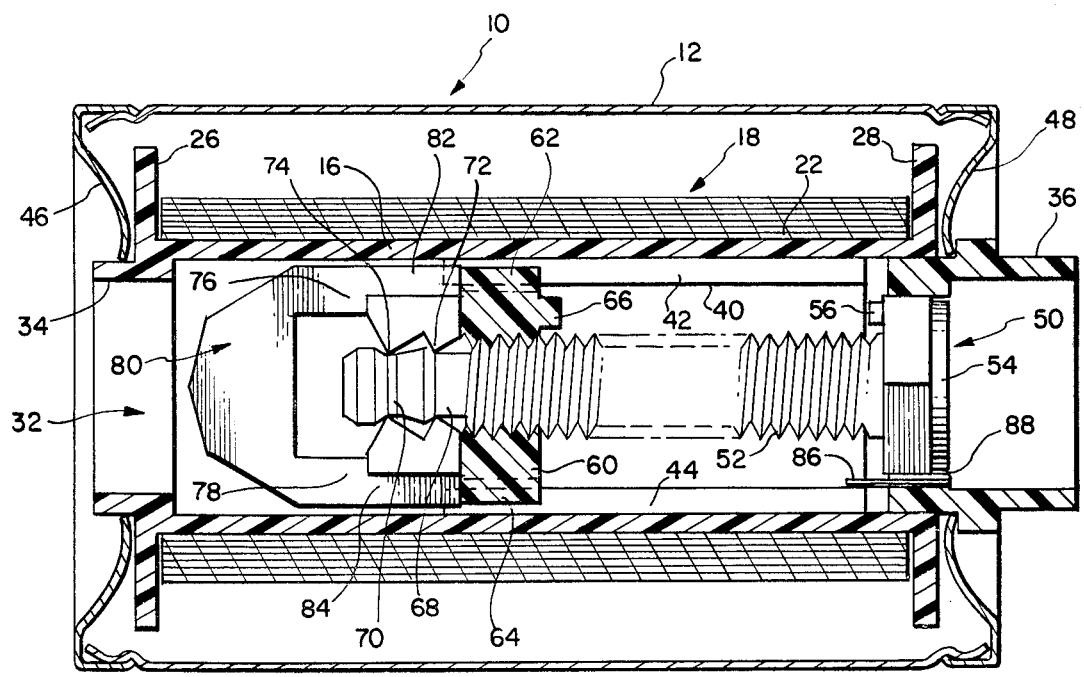
FIG. 2 is a side elevational view, partly in section, of the film assemblage shown in FIG. 1 with the various elements thereof located as shown prior to loading the film assemblage into a camera.
Figure 3:
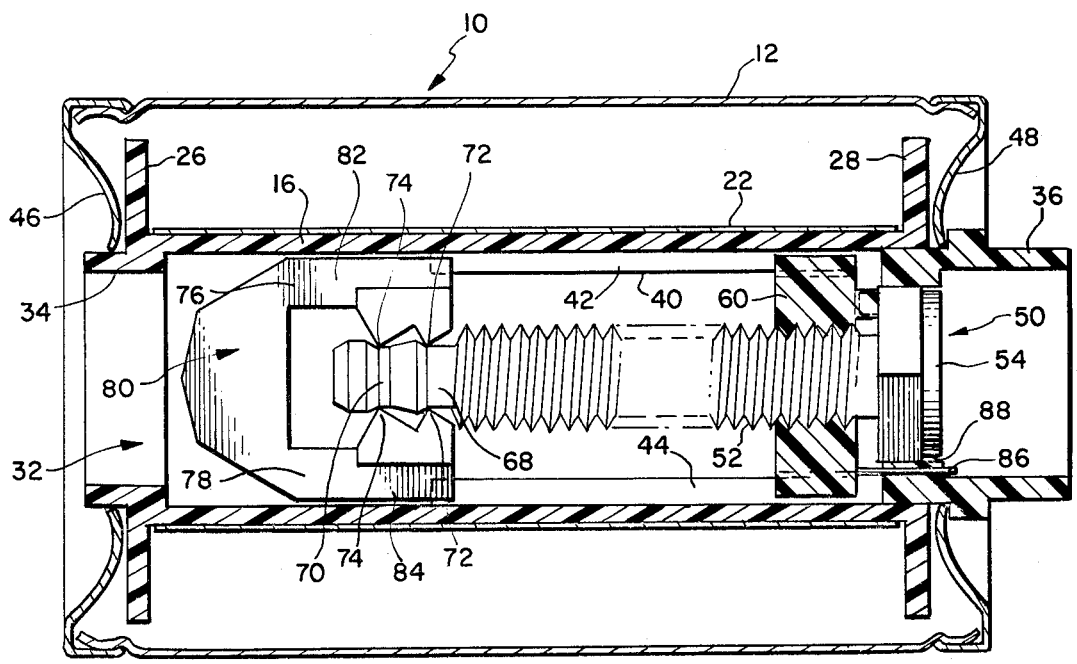
FIG. 3 is a view similar to FIG. 2 showing the positions of the various elements of the film assemblage after the last frame in the strip of film has been photographically exposed within a camera.
Figure 4:
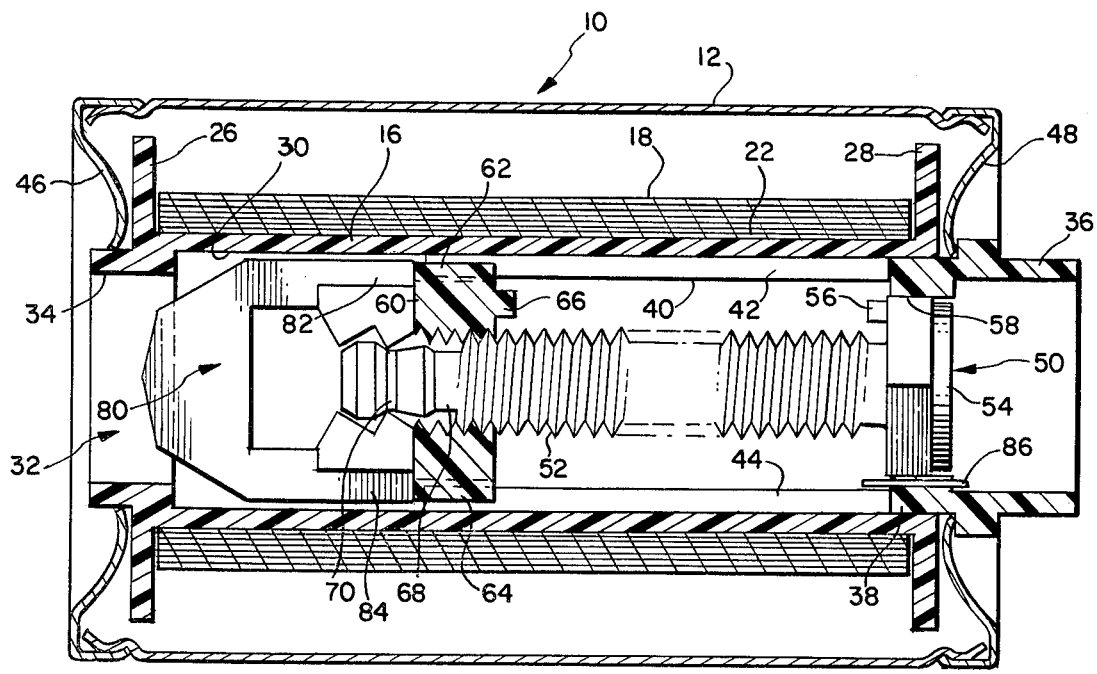
FIG. 4 is a view similar to FIGS. 2 and 3 showing the positions of the various elements of the film assemblage after the exposed film has been substantially recoiled about the film spool, but with the leading end or leader thereof still extending to the exterior of the film cassette, and prior to being placed in a film processor.

A nylon nut 60 is threadably mounted on the shaft 50 for movement therealong between a first position, as shown in FIG. 2, to a second position, as shown in FIG. 3 and then to a third position, as shown in FIG. 4. The nut 60 includes a pair of splines 62 and 64 which are adapted to be received by the keyways 42 and 44, respectively, and a stop 66 which extends outwardly from a face of the nut 60 and in the direction of the aforementioned stop 56. The free end of the shaft 50 includes a pair of longitudinally spaced grooves 68 and 70 which are adapted to receive the resilient projections 72 and 74 which extend inwardly toward each other from the resilient arms 76 and 78 of a generally U-shaped spool drive member 80. As best seen in FIG. 1, the spool drive member 80 includes a pair of oppositely spaced splines 82 and 84 which are adapted to be slidably received by the left ends of the longitudinally extending keyways 42 and 44. The projections 72 and 74 and the grooves 68 and 70 function to maintain the splines 82 and 84 in the keyways 42 and 44.

The various elements of the film assemblage 10 generally occupy the positions shown in FIG. 2 when the film assemblage 10 is loaded into a camera, preferably of the 35 mm type, with the camera's film rewind mechanism (not shown) in engagement with the spool drive member 80 and with the leading end or leader 20 of the film 18 in engagement with the camera's film take-up reel (not shown). As the individual frames in the film 18 are photographically exposed and wound upon the film take-up reel, the movement of the film is transferred to the spool 16 so as to cause the latter to rotate in a clockwise manner, as viewed in FIG. 1. The clockwise rotation of the spool 16 is transferred to the nut 60 via the spline-keyway combination 42, 62 and 44, 64 to thereby drive the nut 60 to the right, as viewed in FIG. 2, until it reaches a second position, as shown in FIG. 3. As the nut 60 enters the second position, the stop 66 thereon moves into engagement with the stop 56 to thereby prevent further rotation of the nut 60 and the spool 16. This takes effect prior to the trailing end 22 of the film 18 moving out of engagement with the spool 16 and, preferably, rotation of the spool 16 is stopped with slightly more than one revolvement of the film 18 remaining on the spool 16. Also, as the nut 60 moves into the aforementioned second position, it engages a pin 86 which extend through an aperture 88 in the bushing 36 and moves it to the right, as viewed in FIG. 3, into a position wherein it is visually recognizable. In other words, in this latter position, the pin 86 indicates that the film 18 has been completely exposed.

After the completion of the exposure of the film 18, the camera's film rewind mechanism is activated to thereby drive the spool drive member 80 in a counterclockwise direction, as viewed in FIG. 1, to thereby drive the spool 16 in a similar direction due to the driving relationship between the splines 82 and 84 of the spool drive member 80 and the keyways 42 and 44. This counterclockwise rotation of the spool 16 is effective to rewind the film 18 thereupon while simultaneously causing the nut 60 to move from its second position, as shown in FIG. 3, to a third position, as shown in FIG. 4. As the nut 60 enters the third position, its left-hand face engages the free ends of the arms 76 and 78 of the U-shaped spool drive member 80 and moves it to the left thereby causing the projections 72 to move out of the groove 68 in the end of the shaft 50 and into the groove 70. This movement of the spool drive member 80 is effective to move the splines 82 and 84 longitudinally to a position wherein their ends have been removed from the keyways 42 and 44 thereby terminating the drive from the camera's film rewind mechanism to the spool 16. This stoppage of rotation of the spool 16 in said counterclockwise direction occurs after the leading end section 20 of the film moves out of engagement with the camera's take-up reel and before it can be rewound into the film cassette 12.

Figure 5:
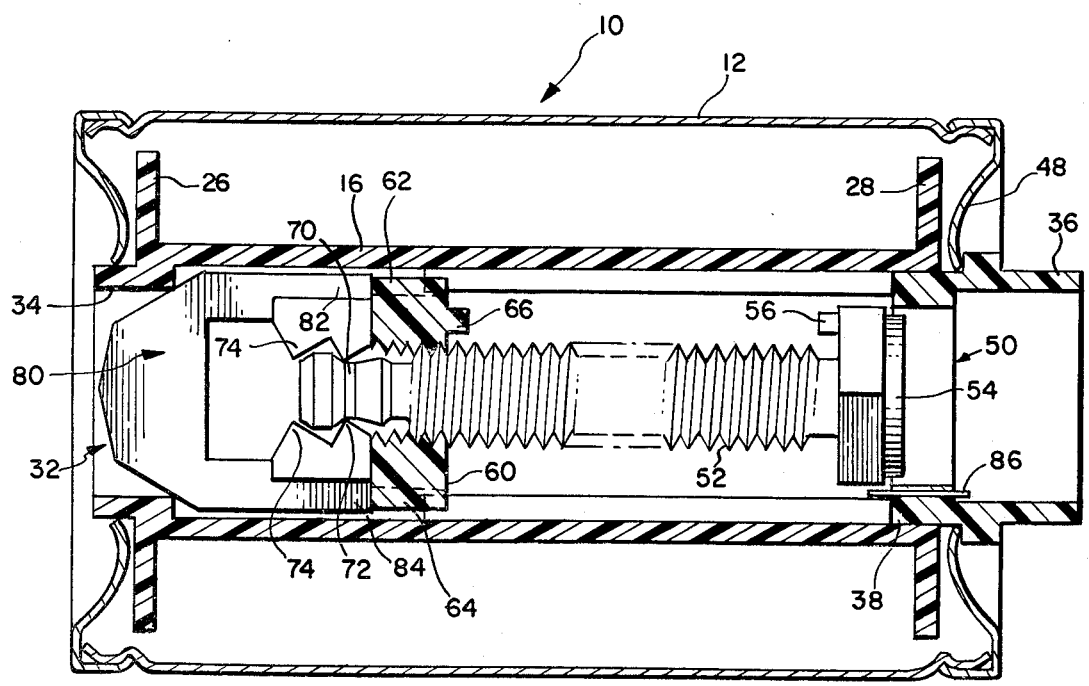
FIG. 5 is a view similar to FIGS. 2-4 showing the positions of the various elements of the film assemblage which enable the exposed film to be completely withdrawn from the film cassette during processing thereof.
Figure 6:
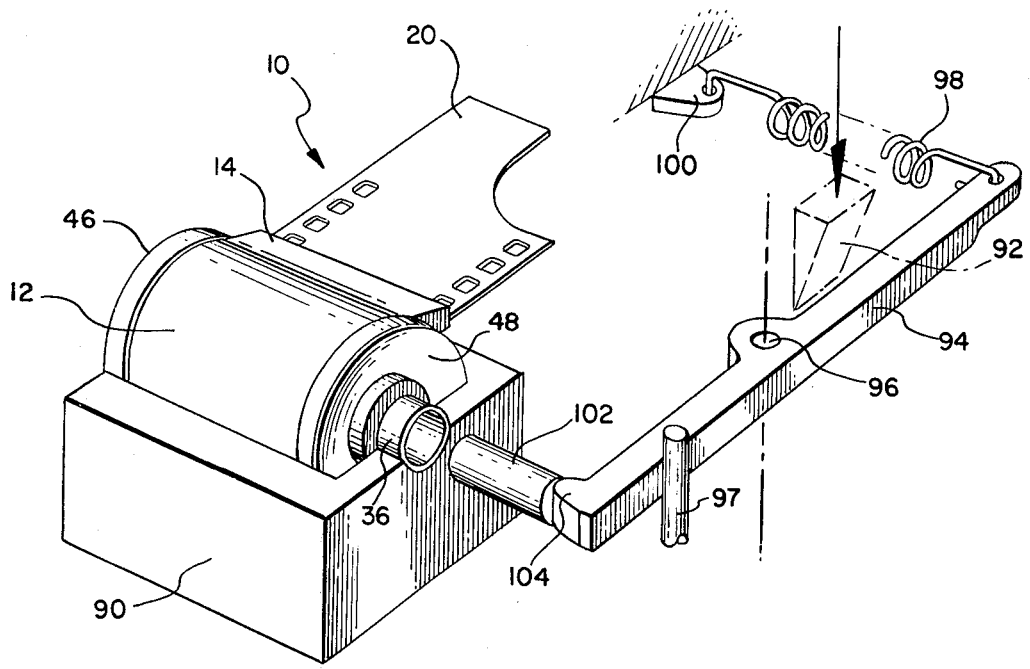
FIG. 6 is a perspective view which schematically depicts one way for an element of a film processor to rearrange certain elements of the film assemblage in order to insure that the film will be completely withdrawn from the film cassette during its processing.

Although the film 18 may be of the conventional type and thus is usually sent to a facility for processing, it is preferred that it be of the self-developing or instant type transparency film, e.g., of the type described in the aforementioned application Ser. No. 207,686 and in U.S. Pat. No. 3,682,637 granted to Edwin H. Land on Aug. 8, 1972. As such it, the film, is now in condition to be removed from the camera and placed in a small compact film processor, a portion of which is shown in FIG. 6. The film processor includes a support 90 which is constructed to hold the film assemblage 10, as shown in FIG. 6, while the leading end 20 of the exposed film 18 is adapted to be connected with another component of the processor, e.g., a take-up reel as described more fully in the aforementioned application Ser. No. 207,686. The loading door (not shown) of the processor is then closed, preferably to initiate the processing cycle. A cam 92, extending from the loading door, is thus moved downwardly into camming engagement with a lever 94 to thereby pivot the latter in a clockwise direction about a pin 96, away from a stop 97 and against the bias of a return spring 98 which has one end secured to the lever 94 and its other end anchored to the processor at 100. This rotation of the lever 94 is effective to move an arm 102, which is gimballed to an end 104 of the lever 94, into the opening in the bushing 36 so as to move the shaft 50 from the position shown in FIG. 4 to that shown in FIG. 5. Thus positioned, the shaft 50 is now free to rotate with the nut 60 and the spool 16 as the take-up reel of the film processor withdraws the exposed film 18 from the film cassette 12. Accordingly, since rotation of the spool 16 no longer drives the nut 60 along the shaft 50, the film 18 may be uncoiled completely from the spool 16 during processing, thereby negating a film cutter in the film processor.

Since certain changes may be made in the above-described photographic film assemblage without departing from the scope of the invention herein involved, it is intended that all matter contained in the above description or shown in the accompanying drawings shall be interpreted as illustrative and not in a limiting sense. For example, while the means for releasably attaching the trailing end 22 of the film 18 to the spool 16 has been described as including the tape 24, as well as slightly more than one wrap of the film about the spool 16 when the nut 60 moves into the second position, is should be understood that this may also be accomplished without the tape. In other words, as long as the end of the film is overlapped by another wrap of the film, continued tension on the film will merely press the trailing end of the film into greater contact with the spool 16.

What is claimed is:

1. A photographic film assemblage comprising:

a film cassette including means defining an exit;

means for supporting a strip of film, said supporting means being rotatably supported within said film cassette;

a strip of film coiled about said supporting means, said film including first and second opposite ends, said first end being adapted to extend to the exterior of said film cassette via said exit and said second end being releasably secured to said supporting means;

means for stopping rotation of said supporting means; and means coupled to said supporting means for movement between a first position wherein said supporting means may be rotated in a first direction as said film is uncoiled therefrom during its photographic exposure in a camera and a second position wherein it is in engagement with said stopping means to thereby preclude further rotation of said supporting means in said first direction to thereby prevent said film from being completely uncoiled from said supporting means.

2. A photographic film assemblage as defined in claim 1 wherein said supporting means includes a longitudinally extending passageway, said assemblage further including a threaded shaft mounted within said passageway with its longitudinal axis generally parallel with the axis of said passageway, said coupled means being threaded on said shaft for movement between said first and second positions.

3. A photographic film assemblage as defined in claim 2 wherein said stopping means is mounted adjacent one end of said shaft.

4. A photographic film assemblage as defined in claim 3 wherein said shaft includes an end section from which said stopping means extends.

5. A photographic film assemblage as defined in claim 2 wherein said passageway includes at least one longitudinally extending keyway and said coupled means includes at least one radially extending spline adapted to be slidably receivable within said keyway for facilitating the movement of said coupled means between said first and second positions.

6. A photographic film assemblage as defined in claim 1 further including means movable into an exposure indicating position by said coupled means as it moves into said second position for indicating that said strip of film has been completely exposed.

7. A photographic film assemblage as defined in claim 6 further including means adapted to be driven by a component of a camera for rotating said supporting means in a second direction so as to recoil said film upon said supporting means while simultaneously moving said coupled means from said second position to a third position in which it disables said driven means before said first end of said film is moved to a position within said film cassette.

8. A photographic film assemblage as defined in claim 7 further including a shaft mounted for movement within said supporting means between an operative position, wherein rotation of said supporting means in said first direction during uncoiling of said film therefrom is effective to cause said coupled means to move from said third position to said second position, and an inoperative position, wherein said rotation of said supporting means in said first direction during said uncoiling of said film is ineffective to move said coupled means to said second position, whereby said film may be completely uncoiled from said supporting means.

9. A photographic film assemblage as defined in claim 8 wherein said movement of said shaft from said operative position to said inoperative position is in response to the operation of an element of a film processor.

10. A photographic film assemblage as defined in claim 1 further including means adapted to be driven by a component of a camera for rotating said supporting means in a second direction so as to recoil said film upon said supporting means while simultaneously moving said coupled means from said second position to a third position in which it disables said driven means before said first end of said film is moved to a position within said film cassette.

11. A photographic film assemblage comprising:

a film cassette including means defining an exit through which a strip of film may pass;

means for supporting a strip of film, said supporting means being rotatably supported within said film cassette;

a strip of film coiled about said supporting means with a first end thereof being adapted to extend to the exterior of said film cassette via said exit and a second end thereof releasably coupled to said supporting means;

means adapted to be driven by a component of a camera for rotating said supporting means in a direction so as to recoil said film about said supporting means subsequent to said film being photographically exposed; and means for automatically disabling said driven means prior to said first end being moved to a position inside of said film cassette.

12. A photographic film assemblage as defined in claim 11 wherein said driven means is mounted for movement between an operative position in which it is in driving engagement with said supporting means and an inoperative position in which it is out of driving engagement with said supporting means.

13. A photographic film assemblage as defined in claim 12 further including means for guiding said disabling means from a second position in which it prevents said supporting means from rotating in a direction so as to uncoil said film from said supporting means to a third position in which it has moved said driven means into its said inoperative position.

14. A photographic film assemblage as defined in claim 13 wherein said supporting means includes a passageway, said disabling means includes a nut, and said guiding means includes a threaded shaft mounted within said passageway for receiving said nut.

15. A photographic film assemblage as defined in claim 14 wherein said guiding means further includes means defining a longitudinally extending slot in a wall of said passageway for receiving a portion of said nut.

16. A photographic film assemblage comprising:

a film cassette including means defining an exit;

means for supporting a strip of film, said supporting means being rotatably supported within said film cassette;

a strip of film coiled about said supporting means, said film including a first end which is adapted to extend to the exterior of the said film cassette via said exit and a second end which is adapted to be releasably secured to said supporting means;

means coupled to said supporting means and being movable thereby into a position locking said supporting means against further rotation prior to said second end of said film becoming detached from said supporting means; and means mounted for movement between an operative position, wherein rotation of said supporting means during the uncoiling of said film therefrom is effective to drive said coupled means into said locking position, and an inoperative position, wherein said rotation of said supporting means during said uncoiling is ineffective to drive said coupled means into said locking position, whereby said film may continue to rotate said supporting means during said uncoiling until said second end of said film becomes detached from said supporting means.

17. A photographic film assemblage as defined in claim 16 further including means for indicating that said film has been photographically exposed.

18. A photographic film assemblage as defined in claim 16 wherein said mounted means includes a threaded shaft upon which said coupled means is mounted and which, when in said operative position, is fixed against rotation relative to said coupled means and which, when in said inoperative position, is free to rotate with said coupled means and said supporting means.

19. A photographic film assemblage as defined in claim 16 wherein said mounted means is adapted to be moved into said inoperative position by a component of a film processor.

20. A photographic film assemblage comprising:

a film cassette including means defining an exit through which a strip of film may pass;

means for supporting a strip of film, said supporting means being rotatably supported within said film cassette;

a strip of film coiled about said supporting means with a first end thereof being adapted to extend to the exterior of said film cassette via said exit and a second end thereof releasably coupled to said supporting means;

exposure indicating means mounted for movement between a first position which indicates that said strip of film has not been completely exposed, and a second position which indicates that said strip of film has been completely exposed; and means, responsive to the uncoiling of said strip of film during exposure thereof, for moving said exposure indicating means into said second position subsequent to the last frame in said strip of film being exposed.

21. A photographic film assemblage comprising:

a film cassette including means defining an exit through which a strip of film may pass;

means for supporting a strip of film, said supporting means being rotatably supported within said film cassette;

a strip of film coiled about said supporting means with a first end thereof being adapted to extend to the exterior of said film cassette via said exit and a second end thereof releasably coupled to said supporting means;

exposure indicating means mounted for movement between a first position which indicates that said strip of film has not been completely exposed, and a second position which indicates that said strip of film has been completely exposed;

means, responsive to the uncoiling of said strip of film during exposure thereof, for moving said exposure indicating means into said second position subsequent to the last frame in said strip of film being exposed; and means for mounting said moving means for movement in a direction coincident with the axis of rotation of said supporting means.

22. A photographic film assemblage as defined in claim 21 wherein said mounting means includes a threaded shaft fixedly mounted within a passageway in said supporting means, said shaft being adapted to guide said moving means into engagement with said exposure indicating means in response to rotation of said supporting means.

* * * * *